United States Patent
Eaton

(10) Patent No.: US 10,950,128 B1
(45) Date of Patent: Mar. 16, 2021

(54) SYSTEMS AND METHODS FOR ASSIGNING PARKING SPOTS TO AUTONOMOUS VEHICLES BASED ON FACTORS SUCH AS DATA TRANSFER THROUGHPUT

(71) Applicant: Ford Global Technologies, LLC, Dearborn, MI (US)

(72) Inventor: Eric Eaton, Lake Worth, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/589,817

(22) Filed: Oct. 1, 2019

(51) Int. Cl.
| | |
|---|---|
| *G08G 1/14* | (2006.01) |
| *H04W 4/44* | (2018.01) |
| *H04W 4/80* | (2018.01) |
| *G05D 1/00* | (2006.01) |

(52) U.S. Cl.
CPC ........... *G08G 1/149* (2013.01); *G05D 1/0027* (2013.01); *G05D 1/0088* (2013.01); *G08G 1/141* (2013.01); *G08G 1/146* (2013.01); *H04W 4/44* (2018.02); *H04W 4/80* (2018.02)

(58) Field of Classification Search
CPC ........ H04W 4/44; H04W 4/80; G05D 1/0027; G05D 1/0088; G08G 1/141; G08G 1/146
See application file for complete search history.

(56) References Cited

U.S. PATENT DOCUMENTS

| | | | |
|---|---|---|---|
| 2012/0188100 A1* | 7/2012 | Min | E04H 6/426 340/932.2 |
| 2017/0169712 A1* | 6/2017 | Penilla | B60W 10/20 |
| 2019/0371175 A1* | 12/2019 | Joos | G08G 1/14 |

* cited by examiner

*Primary Examiner* — Sisay Yacob
(74) *Attorney, Agent, or Firm* — Brandon Hicks; Eversheds Sutherland (US) LLP

(57) ABSTRACT

Exemplary embodiments described in this disclosure are generally directed to systems and methods for assigning parking spots to autonomous vehicles based on data transfer throughput and other considerations. In one exemplary method, a server computer receives from a first autonomous vehicle, information regarding a size of a first dataset available for uploading from the first autonomous vehicle into the server computer. The server computer may further receive from a second autonomous vehicle, information regarding a size of a second dataset that the second autonomous vehicle has available for uploading into the server computer. The server computer may then assign parking spots to the two autonomous vehicles based on evaluating various factors such as the size of one or both datasets, characteristics of wireless links for carrying out data transfer in the parking area, characteristics of various access points in the parking area, and priorities associated with the data transfer.

20 Claims, 5 Drawing Sheets

SYSTEMS AND METHODS FOR ASSIGNING PARKING SPOTS TO AUTONOMOUS VEHICLES BASED ON FACTORS SUCH AS DATA TRANSFER THROUGHPUT

FIELD OF THE DISCLOSURE

This disclosure generally relates to autonomous vehicles and more particularly relates to systems and methods for handling data transfers between autonomous vehicles and data collection systems.

BACKGROUND

Autonomous vehicles, which are often referred to by various other names such as robotic vehicles and unmanned vehicles, have of late become the focus of numerous developmental efforts. The developmental efforts have been directed to using autonomous vehicles for not only transporting passengers but also for delivering various types of articles in various types of environments. An autonomous vehicle may incorporate navigation and sensing equipment that enables the autonomous vehicles to negotiate obstacles that may be encountered on a road and perform some other actions associated with transporting people and/or delivering articles. In some cases, the navigation and sensing equipment may be programmed to operate using a set of rules and guidelines based on some predictable scenarios and conditions.

However, an autonomous vehicle may encounter situations that are not addressed by such a set of rules and guidelines. Consequently, an autonomous vehicle may be programmed to collect data related to such situations and the collected data archived for various purposes such as for modifying the operations of various autonomous vehicles.

In some applications, such as in the case of a ride services operation, a fleet of autonomous vehicles may be parked overnight in a garage and data collected by each of the autonomous vehicles may be wirelessly uploaded into a server computer. The amount of data to be uploaded can be quite large due to the number of autonomous vehicles participating in the uploading operation and can lead to certain problems in some cases. The problems can increase when data has to be not only uploaded from the autonomous vehicles to the server computer but downloaded from the server computer to the autonomous vehicles as well. Uploading and/or downloading problems may be caused by various factors such as wireless bandwidth limitations, parking spot availability, and parking time limitations. It is therefore desirable to find solutions for efficiently transferring data between a number of autonomous vehicles and one or more server computers.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
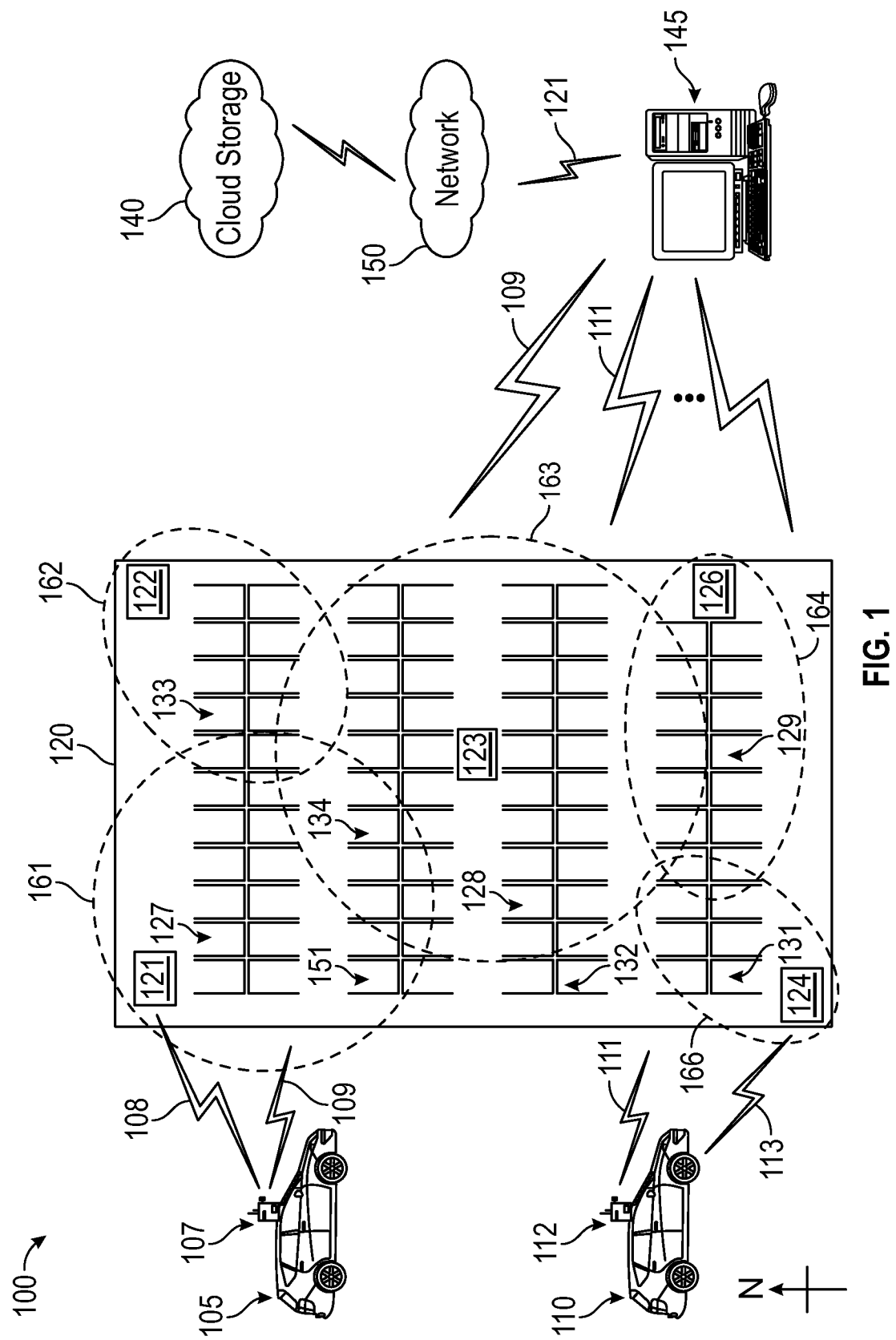
FIG. 1 shows an exemplary system for assigning parking spots to autonomous vehicles based on factors such as data transfer throughput, in accordance with an embodiment of the disclosure.

In terms of a general overview, certain embodiments described in this disclosure are directed to systems and methods related to assigning parking spots to autonomous vehicles based on data transfer throughput and other considerations. In an exemplary method in accordance with the disclosure, a server computer receives, from a first autonomous vehicle, information regarding a size of a first dataset that the first autonomous vehicle has available for uploading into the server computer via any one or more of several access points provided in a parking area. The server computer may further receive, from a second autonomous vehicle, information regarding a size of a second dataset that the second autonomous vehicle has available for uploading into the server computer. The server computer may assign parking spots to the two autonomous vehicles based on evaluating various factors such as the size of one or both datasets, characteristics of wireless links for carrying out data transfer in the parking area, characteristics of various access points in the parking area, and priorities associated with the data transfer.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "server computer" as used in this disclosure refers to one or more of various types of computers that may be located in various places for carrying out various kinds of data transfer activities and communication activities. The word "dataset" as used in this disclosure can refer to any of various types of data such as structured data, unstructured data, ordered data, random data, static data, dynamic data, numbers, text, alphanumeric characters, graphs, maps, and images. Words such as "wireless" or "wirelessly" as used herein are not intended to preclude other forms of communication such as optical communications and wired communications. The examples provided herein encompass such alternative communication technologies. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows an exemplary system 100 for assigning parking spots to autonomous vehicles in accordance with an embodiment of the disclosure. In this example, the parking spots are located in a parking area 120 that may be any of various types of parking areas, such as, for example, a parking garage inside a building, a parking lot in an open area outside, or one or more parking spots provided on a road. The parking area 120 includes one or more access points. The "access points" are communication devices that can be used for various purposes such as data transfers and communications with various types of vehicles equipped with compatible communication equipment. In this example illustration, "n" (n≥2) access points are configured to exchange data and communications with wireless communication systems provided on autonomous vehicles. In another example embodiment, a single access point may be employed.

The "n" access points may include an access point 121 located at a north-west corner of the parking area 120, an access point 122 that is located at a north-east corner of the parking area 120, an access point 124 that is located at a south-west corner of the parking area 120, an access point 126 that is located at a south-east corner of the parking area 120, and an access point 123 that is centrally located in the parking area 120. The number of access points that are employed, and the location of the various access points in the parking area 120, can be based on various factors, and can vary from one application to another.

For example, the number of access points, and the location of the access points in the parking area 120, may be determined on the basis of factors such as number of parking spots in the parking area 120, certain characteristics of the parking area 120, desired data transfer rates, and/or operational characteristics of the equipment used in the access points. A few example characteristics of the parking area 120 may include a shape of the parking area 120 (square shape, rectangular shape, circular shape, oval shape, narrow shape, broad shape, etc.), obstructions present in the parking area 120 (walls, trees, buildings etc.) and structures neighboring the parking area 120 (skyscrapers and wireless signal towers, for example). A few examples of operational characteristics of the equipment used in the access points may include wireless signal bandwidth, wireless signal spectrum, transmitter signal strength, receiver signal sensitivity, and antenna signal pattern, antenna directivity (omni-directional, shaped beam etc.).

In a first exemplary application, a single access point such as the access point 123 may be employed when the parking area 120 contains a limited number of parking spots, and the amount of data to be transferred between the access point 123 and various autonomous vehicles parked in the parking area 120 is of a limited nature and/or can be carried out over a prolonged period of time.

In a second exemplary application, the number of access points employed in the parking area 120 may be large when the parking area 120 is large and a significant number of autonomous vehicles are parked in the parking area 120 for a limited amount of time. The second exemplary application may apply for example, to a situation where the parking area 120 is a garage in which a large number of autonomous vehicles that constitute a vehicle fleet of a ride services operation (such as Uber® or Lyft®) are parked overnight. Some or all of the autonomous vehicles parked overnight in the parking area 120 may be involved with activities such as recharging battery systems, uploading data to the access points, and/or downloading data from the access points. In an exemplary scenario, each autonomous vehicle entering the parking area 120 may seek an empty parking spot and occupy the parking spot based on, for example, a proximity to a battery charging outlet. However, the wireless signal coverage available at the parking spot may be sub-optimal for exchanging data with an access point even though the autonomous vehicle has a large amount of data to be transferred. Consequently, it may be desirable in accordance with the disclosure, to provide some guidance to the autonomous vehicle to park in a parking spot that is more suited for data transferring activities.

The various access points provided in the parking area 120 are communicatively coupled to one or more server computers, such as an exemplary server computer 145. In a first exemplary implementation, some or all of the access points are communicatively coupled to the server computer 145 by using one or more of various types of wired communication elements such as wires, coaxial cables, and/or optical cables. The server computer 145 may, for example, be located in a room on the premises of the parking area and the cables may be provided in structural elements of the parking area 120 (walls, pillar, floors, ceilings etc.). Various types of transmission protocols may be used for transmitting messages and data through the wires, coaxial cables, and/or optical cables.

In a second exemplary implementation, some or all of the access points are wirelessly coupled to the server computer 145 using various types of wireless equipment (Wi-Fi routers, wireless transceivers, Wi-Fi repeaters, antennas etc.) that may use one or more of various types of wireless transmission protocols.

The wired and/or wireless communication links may be used to transfer data from the access points to the server computer 145 and/or from the server computer 145 to the access points.

The server computer 145 may also be configured to wirelessly communicate with various wireless components provided in various types of vehicles. For example, the server computer 145 may operate over a communication link 109 to communicate with a communications unit 107 provided in a first autonomous vehicle 105. In one exemplary implementation, the communication link 109 is a wireless communication link. The communications unit 107 provided in a first autonomous vehicle 105 may also be configured to communicate with a communications unit 112 provided in a second autonomous vehicle 110, and/or with other communications units provided in other autonomous vehicles.

In at least some applications, the content carried over the communication link 109 may be different than that carried over the wireless link 111. For example, the server computer 145 may use the communication link 109 to transmit a first signal to the autonomous vehicle 105 instructing the autonomous vehicle 105 to park in a parking spot 127 that is located in a wireless coverage area of the access point 121. The server computer 145 may use the wireless link 111 to transmit a second signal to the autonomous vehicle 110 instructing the autonomous vehicle 110 to park in a different parking spot 131 that is located in a wireless coverage area of the access point 124. The communications unit 107 provided in the autonomous vehicle 105 may be configured to disregard a frequency band or channel on which the second signal is transmitted to the autonomous vehicle 110. Similarly, the communications unit 112 provided in the autonomous vehicle 110 may be configured to disregard a frequency band or channel on which the first signal is transmitted to the autonomous vehicle 105.

The communications unit 107 provided in the autonomous vehicle 105 may further use a communication link 108 to communicate with the various access points, such as, for example, to communicate with the access point 121. Communications with the access point 121 may take place after the autonomous vehicle 105 is parked in the parking spot 127 as instructed by the server computer 145. The communication link 108 may be implemented by using one or more of various types of technologies and transmission protocols. In one example embodiment, the communication link 108 may be optimized for exchanging data between the communications unit 107 and the access point 121 (uploading and/or downloading data) rather than for exchanging messages and communications. Accordingly, the communication link 108 may employ a data transmission protocol rather than, for example, a communication protocol used by the server computer 145 to communicate with the communications unit 107 over the communication link 109.

The server computer 145 may be coupled to a network 150 for communicating with various elements such as other computers and storage elements. The network 150 may be a public network such as the Internet and/or a private network such as a corporate wide area network or a local area network. The server computer 145 can use the network 150 to transfer data to the cloud storage 140 (such as data uploaded into the access points from the autonomous vehicles) and/or to fetch data from the cloud storage 140 for downloading into one or more autonomous vehicles.

Figure 2:
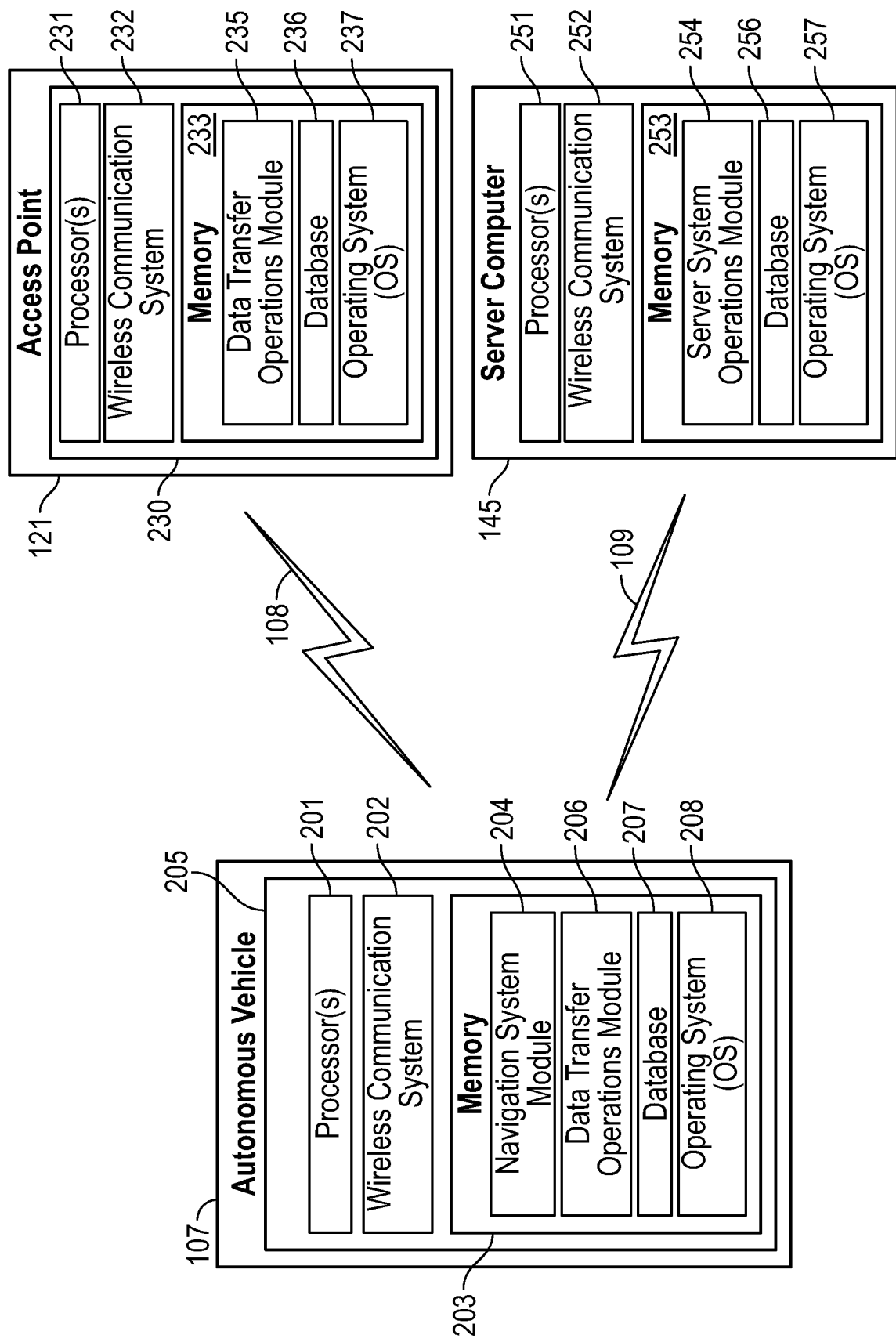
FIG. 2 shows some exemplary components that may be included in some of the elements of the system shown in FIG. 1.

FIG. 2 shows some exemplary components that may be included in various elements of the system 100. The exemplary components include a computer 205 that is located in the autonomous vehicle 105 and configured to operate in conjunction with one or more elements (not shown) that are a part of the communications unit 107. In some cases, the computer 205 may be co-located with the communications unit 107 in an enclosure mounted on the autonomous vehicle 105. The other exemplary autonomous vehicle 110 may include a substantial similar computer configured to operate in conjunction with one or more elements of the communications unit 112 located in the autonomous vehicle 110.

The computer 205 may include several components such as a processor 201, a wireless communication system 202, and a memory 203. The processor 201 can be configured to access the memory 203 and execute computer-executable instructions stored in the memory 203 for performing various operations in accordance with the disclosure.

The wireless communication system 202 may cooperate with elements such as a wireless transceiver coupled to an antenna in the communications unit 107, so as to allow the autonomous vehicle 105 to wirelessly communicate with various entities such as the server computer 145 (via the communication link 109) and an access point such as the access point 121 (via the communication link 108). The communication link 109 and the communication link 108 may be characterized in various ways such as, for example, by a data rate, a frequency bandwidth, and/or an operational spectrum. In one example implementation, the communication link 109 may employ cellular wireless technologies such as 3G, 4G, or 5G cellular wireless technologies.

The memory 203, which is one example of a non-transitory computer-readable medium, may be used to store an operating system (OS) 208, a database 207, and various code modules such as a navigation system module 204 and a data transfer operations module 206. Some of the code modules may be configured to cooperate with various types of hardware provided in the autonomous vehicle 105 for carrying out various operations.

For example, the navigation system module 204 may include software that cooperates with various hardware components in the autonomous vehicle 105. A few examples of such hardware may include a sensor system and various other components such as a steering mechanism, an ignition switch, an accelerator, a braking mechanism, and a Global Positioning System (GPS) system. The sensor system (not shown) may include one or more of various devices, such as, for example, video cameras, motion detectors, distance sensors, proximity sensors, audio sensors, and light detection and ranging (LIDAR) systems, that may be used by the computer 205 to guide the autonomous vehicle 105 through traffic in a city, and may also be used in various applications in accordance with the disclosure.

The data transfer operations module 206 may be used by the processor 201 to perform various operations such as to upload data stored in the database 207 to an access point (such as the access point 121) and to download data from an access point (such as the access point 121). The uploaded data and/or the downloaded data may be stored in the database 207 in the form of one or more datasets. For example, upload data may include a first dataset that pertains to data collected by the autonomous vehicle 105 over a period of time (such as, for example, during the day) before a time at night when the autonomous vehicle 105 enters the parking area 120. In one exemplary implementation, the first dataset, which may pertain to events and situations encountered, recorded, and stored by the autonomous vehicle 105 in the database 207 during the day, may be transferred by the access point 121 to the server computer 145. The server computer 145 may then use the first dataset as historical information and/or training information to be provided to other autonomous vehicles. The first dataset uploaded by the autonomous vehicle 105 can thus in at least some cases, become data that is downloaded to the autonomous vehicle 110, for example.

The exemplary components shown in FIG. 2 further include a computer 230 that may be a part of an access point, such as, for example, the access point 121. The computer 230 may include several components such as a processor 231, a wireless communication system 232, and a memory 233. The processor 231 can be configured to access the memory 233 and execute the computer-executable instructions stored in the memory 233 for performing various operations associated with an access point in accordance with the disclosure.

The wireless communication system 232 may be used for carrying out wireless communications with various entities such as the server computer 145 (via a wireless link or wired connection) and various autonomous vehicles such as, for example, the autonomous vehicle 105 and the autonomous vehicle 110. The memory 203, which is another example of a non-transitory computer-readable medium, may be used to store an operating system (OS) 237, a database 236, and various code modules such as a data transfer operations module 235. The data transfer operations module 235 may be used by the processor 231 to perform various operations such as uploading data from an autonomous vehicle and storing the uploaded data in the database 236 and/or downloading data stored in the database 236 to an autonomous vehicle. The upload data and the downloaded data may be stored in the database 236 in the form of one or more datasets.

The server computer 145 shown in FIG. 2 may include several components such as a processor 251, a wireless communication system 252, and a memory 253. The processor 251 can be configured to access the memory 253 and execute the computer-executable instructions stored in the memory 253 for performing various operations in accordance with the disclosure.

The wireless communication system 252 may be used for carrying out wireless communications with various entities such as one or more access points and one or more autonomous vehicles. The memory 203, which is yet another example of a non-transitory computer-readable medium, may be used to store an operating system (OS) 257, a database 256, and various code modules such as a data transfer operations module 254. The data transfer operations module 254 may be used by the processor 251 to perform various operations such as receiving data from, and transmitting data to, various access points in the parking area 120 and/or to cloud storage 140. The data may be stored in the database 256 in the form of one or more datasets.

Figure 3:
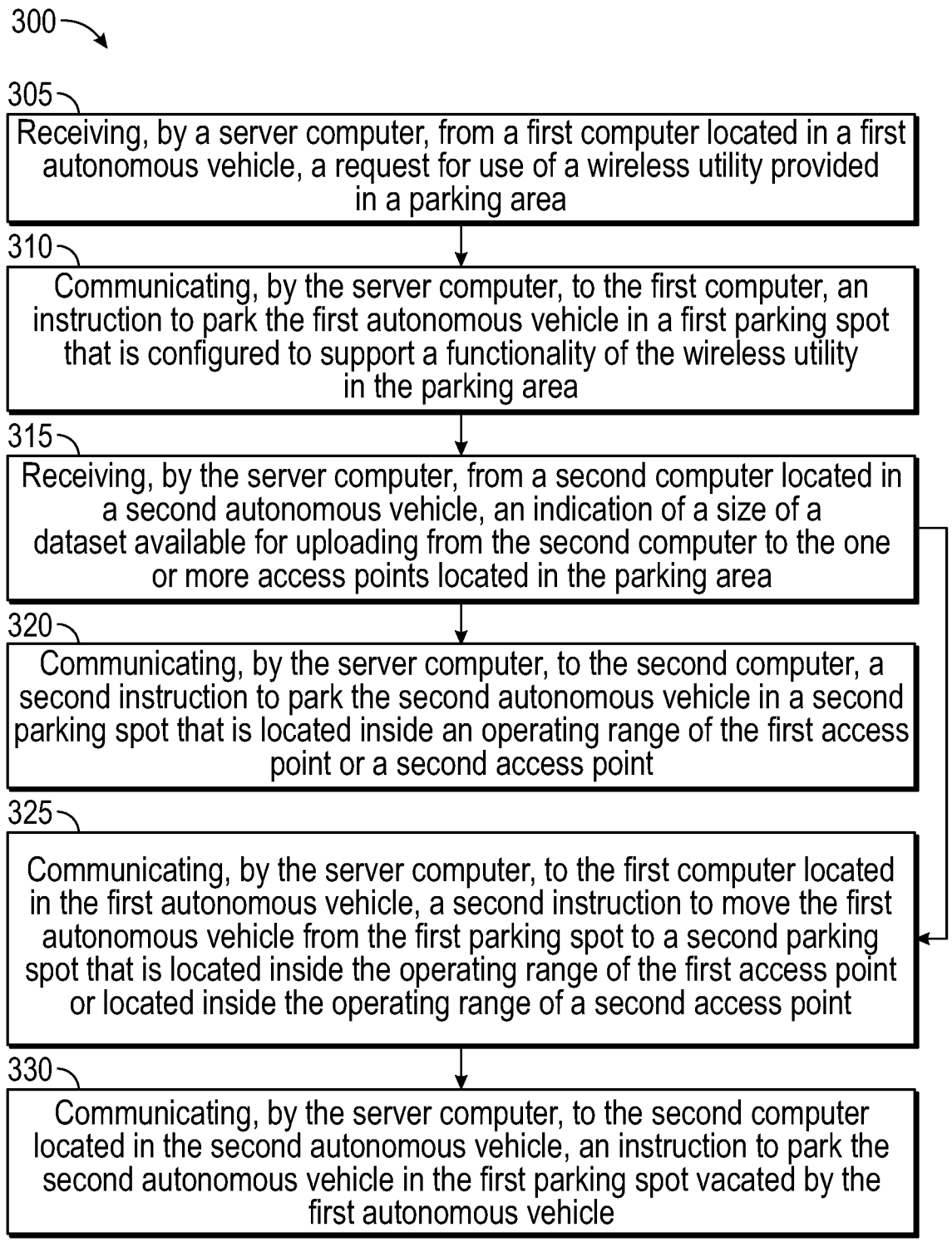
FIG. 3 shows an exemplary flowchart of a method for assigning parking spots to autonomous vehicles based in part on data transfer throughput, in accordance with an embodiment of the disclosure.

FIG. 3 shows an exemplary flowchart 300 of a method for assigning parking spots to autonomous vehicles based in part on data transfer throughput, in accordance with an embodiment of the disclosure. The flowchart 300 illustrates an exemplary sequence of operations that can be implemented in hardware, software, or a combination thereof. In the context of software, the operations represent computer-executable instructions stored on one or more non-transitory computer-readable media such as the memory 203, the memory 233, and the memory 253, that, when executed by one or more processors such as the processor 201, the processor 231, and the processor 251, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 300 may be carried out by using the data transfer operations module 206, the data transfer operations module 235, and/or the data transfer operations module 254. The operations indicated in the flowchart 300 have been described below by using the system 100 shown in FIG. 1 and exemplary components shown in FIG. 2. However, it must be understood that the flowchart 300 may be equally applicable to various other systems and components in accordance with the disclosure.

At block 305, the server computer 145 may receive from a first computer that is provided in a first autonomous vehicle (such as, for example, from the computer 205 provided in the autonomous vehicle 105), an indication of a size of a first dataset available for uploading from the computer 205 to one or more access points located in the parking area 120. The computer 205 may determine the size of the first dataset by using the processor 201 to execute computer-executable instructions associated with the data transfer operations module 206. The wireless communication system 202 may transmit the size indication to the wireless communication system 252 of the server computer 145 over the communication link 109.

In one example case, the first dataset may be data that has been collected by the autonomous vehicle 105 during the day, prior to the autonomous vehicle 105 approaching the parking area 120 at night. The data may have been collected by the autonomous vehicle 105 using various sensors and devices (such as sound sensors, thermal sensors, imaging systems, and/or audio/video recording systems), and stored in the database 207.

In another example case, the autonomous vehicle 105 may be operated by a ride services operator and the first dataset may be financial data pertaining to payments made by customers who have used the autonomous vehicle 105 prior to the autonomous vehicle 105 approaching the parking area 120.

At block 310, the server computer 145 provides to the autonomous vehicle 105, instructions to park the autonomous vehicle 105 in a parking spot 127 that is located inside an operating range 161 of the access point 121. The server computer 145 may provide the instructions to the autonomous vehicle 105 based on various factors that may be used for determining that the access point 121 would be suitable for receiving the first dataset. Some exemplary factors that may be used for making the determination can include the size of the first dataset, characteristics of the communications unit 107 provided in the autonomous vehicle 105, characteristics of the access point 121 (for example, a data transfer rate offered by the access point 121, a data storage capacity of the database 236), characteristics of the communication link 108 (for example, communication format, bandwidth, communication frequency, and/or communication spectrum), and/or weather in the parking area 120 (for example, adverse weather conditions that may affect communications between the communications unit 107 in the autonomous vehicle 105 and the access point 121).

In some cases, the server computer 145 may determine that the access point 121 is unsuitable for handling the first dataset, and/or that all parking spots located inside the operating range 161 of the access point 121 are already occupied. Consequently, the server computer 145 may provide to the autonomous vehicle 105, instructions to park the autonomous vehicle 105 in a parking spot 133 rather than the parking spot 127. The parking spot 133 is located inside an operating range 162 of the access point 122.

At block 315, the server computer 145 may receive from a second computer that is provided in a second autonomous vehicle, (such as, from a computer (not shown) in the autonomous vehicle 110), an indication of a size of a second dataset available for uploading from the computer in the autonomous vehicle 110 to one or more access points located in the parking area 120. In one example case, the second dataset may be data that has been collected by the autonomous vehicle 110 during the day, prior to the autonomous vehicle 110 approaching the parking area 120 at night. In another example case, the autonomous vehicle 110 may be operated by a ride services operator and the second dataset may be financial data pertaining to payments made by customers who have used the autonomous vehicle 110 prior to the autonomous vehicle 105 approaching the parking area 120.

The server computer 145 has two options that may be executed on the basis of the information provided by the autonomous vehicle 110 with respect to the second dataset. As a first option, at block 320, the server computer 145 may provide to the autonomous vehicle 110, instructions to park the autonomous vehicle 110 in a suitable parking spot such as, for example, a parking spot 131 that is located inside an operating range 166 of the access point 124. The server computer 145 may provide the instructions based on evaluating factors such as the size of the second dataset indicated by the autonomous vehicle 110, the size of the first dataset indicated by the autonomous vehicle 105, or a combination of sizes of the first dataset and the second dataset.

For example, the server computer 145 may determine based on the size of the second dataset (a large size, for example) that the access point 124 is better suited than some or all of the other access points in the parking area 120. As another example, the server computer 145 may determine based on the size of the first dataset of the first autonomous vehicle 105 and/or on the combined size of the first dataset and the second dataset that it is inadvisable to instruct the second autonomous vehicle 110 to occupy a parking spot located inside the operating range 161 of the access point 121 due to the limited data storage capacity of the access point 121.

In some cases, the server computer 145 may find neither the access point 121 nor the access point 124 suitable for handling the second dataset and/or may be aware that all parking spots located inside the operating range 166 of the access point 124 are already occupied. Consequently, the server computer 145 may provide to the autonomous vehicle 110, instructions to park the autonomous vehicle 110 in a parking spot 129 that is located inside an operating range 164 of the access point 126 rather than park in the parking spot 131.

As a second option that is based on the size of the second dataset, at block 325, the server computer 145 may provide to the autonomous vehicle 105, instructions to move the autonomous vehicle 105 from the parking spot 127 to a different parking spot such as, for example, another parking spot located inside the operating range 161 of the access point 121, a parking spot located inside the operating range 166 of the access point 122, or a parking spot located inside an operating range 163 of the access point 123.

At block 330, the server computer 145 may provide to the autonomous vehicle 110, instructions to park the autonomous vehicle 110 in the parking spot 127 vacated by the autonomous vehicle 110. The server computer 145 may provide these instructions based on evaluating various factors such as the size of the second dataset indicated by the autonomous vehicle 110, characteristics of the communications unit 112 provided in the autonomous vehicle 110, characteristics of the access point 121 (for example, an upload/download data transfer rate offered by the access point 121), characteristics of a communication link between the autonomous vehicle 110 and the access point 121 (for example, communication format, bandwidth, communication frequency, and/or communication spectrum), and/or weather in the parking area 120 (for example, adverse weather conditions that may affect communications between the communications unit 112 in the autonomous vehicle 110 and various access points).

Some additional factors that may be used by the server computer 145 to determine suitable parking spots for various autonomous vehicles such as the autonomous vehicle 105 and the autonomous vehicle 110, can include: coverage provided by an access point, a time of day when the autonomous vehicle is parked in the parking area 120, an amount of time that the autonomous vehicle will be parked in the parking area 120, a priority provided to the autonomous vehicle for transferring data to the access points located in the parking area 120, historical information associated with data transfers, and whether operations associated with the autonomous vehicle are mainly directed at uploading data from the autonomous vehicle to an access point, mainly directed at downloading data from an access point into the autonomous vehicle, or a combination of uploading and downloading data.

In some cases, the server computer 145 may instruct an autonomous vehicle such as the autonomous vehicle 105 to park in a parking spot such as a parking spot 134 that is located inside an area where the operating range 161 of the access point 121 overlaps the operating range 162 of the access point 122. When parked in the parking spot 134, the access point 121 as well as the access point 122 may be concurrently used for data transfers with respect to the autonomous vehicle 105. For example, the first dataset may be uploaded from the computer 205 of the autonomous vehicle 105 to the access point 121 and another dataset may be concurrently downloaded into the computer 205 of the autonomous vehicle 105 from the access point 122.

In some other cases, the server computer 145 may determine that a parking spot such as a parking spot 134 is unsuitable for parking an autonomous vehicle due to interference and poor data transfer in the area where the operating range 161 of the access point 121 overlaps the operating range 162 of the access point 122.

In yet some other cases, the server computer 145 may determine that a parking spot such as a parking spot 134 is unsuitable for parking an autonomous vehicle due to interference caused by another autonomous vehicle that is already parked near the parking spot 134.

Figure 4:
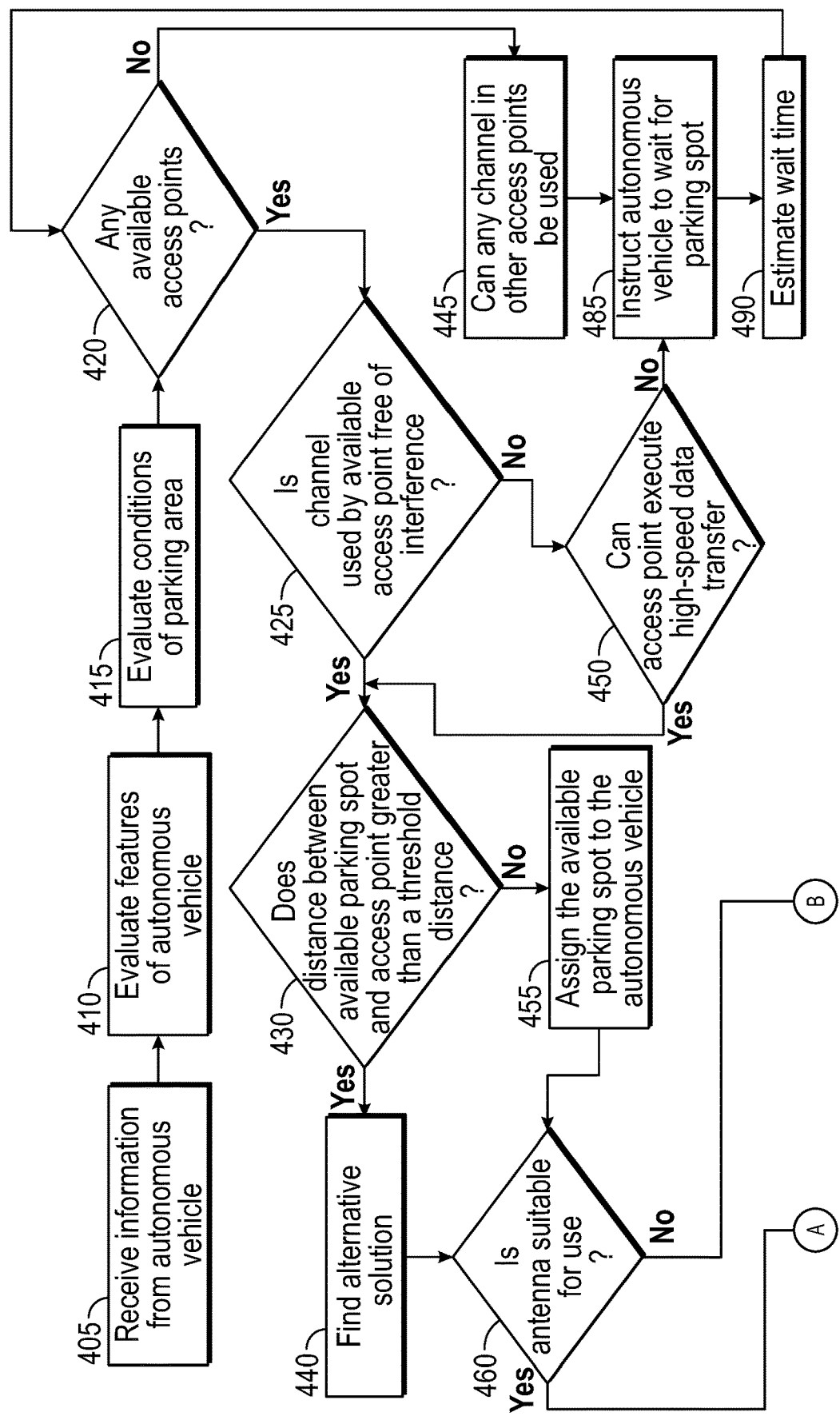
FIG. 4 another exemplary flowchart of a method for assigning parking spots to autonomous vehicles based in part on data transfer throughput, in accordance with an embodiment of the disclosure.
Figure 4:
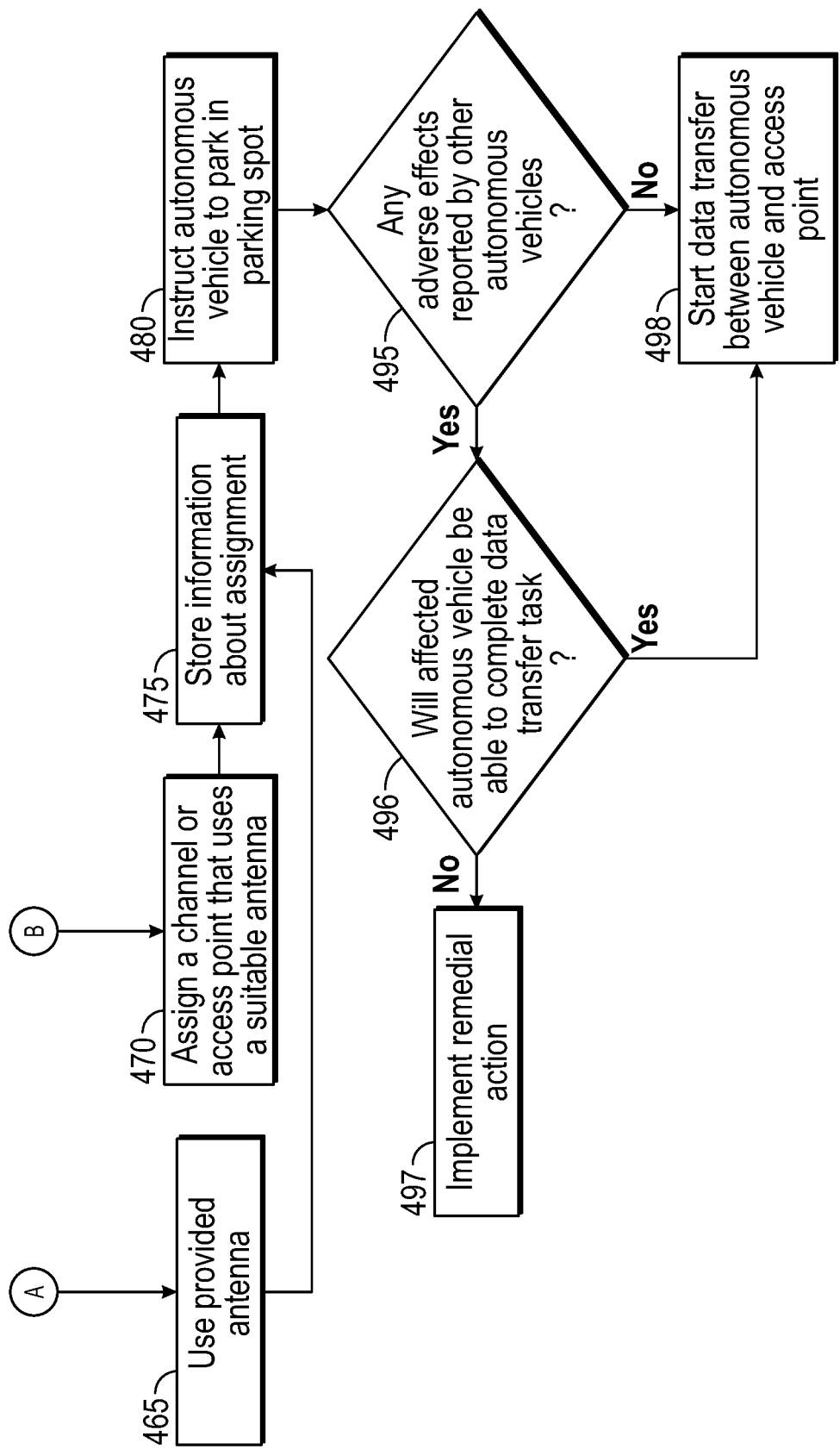

FIG. 4 shows an exemplary flowchart of a method for assigning parking spots to autonomous vehicles based in part on data transfer throughput, in accordance with an embodiment of the disclosure. At block 405, the server computer 145 may receive from a first computer that is provided in a first autonomous vehicle (for example, from the computer 205 provided in the autonomous vehicle 105), an indication of a size of a first dataset available for uploading from the computer 205 to one or more access points located in the parking area 120.

At block 410, the server computer 145 may evaluate various features of the autonomous vehicle 105 (such as a make and model of the autonomous vehicle 105) and capabilities of the communications unit 107.

At block 415, the server computer 145 may evaluate various conditions of the parking area 120 such as availability of empty parking spots and data transfer activities between parked autonomous vehicles and access points.

At block 420, a determination may be made by the server computer 145 about the availability of one or more access points to provide data transfer services to the autonomous vehicle 105. If an access point is available (such as the access point 121), at block 425 a determination may be made whether one or more wireless channels used by the access point 121 is free of interference. If an interference-free wireless channel is available, at block 430, a determination may be made whether a distance between an available parking spot and the access point 121 is greater than a threshold distance. The threshold distance may be based on an effective coverage area provided for example, by a channel in the access point 121. The access point 121 may utilize a certain type of wireless communication technology (for example, operating in a 5.0 GHz band).

If the distance between the available parking spot and the access point 121 exceeds the threshold distance, at block 440, an alternative solution may be pursued, such as by using a different channel operating at a different frequency (a lower frequency such as 2.4 GHz) or by assigning a parking spot covered by another access point that utilizes a different type of wireless communication technology.

If the distance between the available parking spot (parking spot 127) and the access point 121 is lower than the threshold distance, at block 455, the server computer 145 may decide to assign to the autonomous vehicle 105, the parking spot 127 that is serviced by the access point 121 using the channel operating in the 5.0 GHz band.

At block 460, a determination may be made whether an antenna of the communications unit 107 and/or the access point 121 is suitable for the selected data rate (2.5 GHz or 5.0 GHz). If the antenna of the communications unit 107 and/or the access point 121 is suitable for the selected data rate, at block 465, the antenna provided in the communications unit 107 and/or the access point 121 is used. If the antenna of the communications unit 107 and/or the access point 121 is not suitable for the selected data rate, at block 470, a different channel or access point that uses a suitable antenna may be assigned.

At block 475, the server computer 145 may store information indicating assignment of the parking spot 127 to the autonomous vehicle 105. At block 480, the server computer 145 may instruct the autonomous vehicle 105 to park in the parking spot 127 covered by the access point 121 and use the appropriate antenna.

At block 495, a determination may be made whether any other autonomous vehicle parked in the parking area is reporting to the server computer 145, any adverse effects (such as a reduction in a data transfer rate), due to the autonomous vehicle 105 parking in the parking spot 127 and communicating with the access point 121. If no adverse effects are reported, at block 498, data transfer may be started between the autonomous vehicle 105 and the access point 121. However, if adverse effects are reported, at block 496, a determination may be made whether an autonomous vehicle suffering the adverse effect will be able to complete a data transfer task. If the data transfer task can be completed, at block 498, the data transfer may be started between the autonomous vehicle 105 and the access point 121. If the data transfer task cannot be completed, at block 497, the server computer 145 may evaluate and implement one or more remedial actions such as reassigning the autonomous vehicle 105 to a different parking spot and/or moving another autonomous vehicle from one parking spot to another.

Attention is now drawn back to block 420, where a determination may be made by the server computer 145 about the availability of one or more access points to provide data transfer services to the autonomous vehicle 105. If an access point is not available, at block 445 a determination may be made whether any channels in any of the access points can be made available for use. If no channels can be made available, at block 485, the autonomous vehicle 105 may be instructed to wait for an open parking spot and/or available access point. At block 490, the server computer 145 may carry out certain operations such as estimating an amount of time needed for data transfer from the computer 205 of the autonomous vehicle 105, followed by determining the availability of one or more access points to provide data transfer services to the autonomous vehicle 105 (block 420).

Attention is further drawn to block 425 that pertains to a determination being whether one or more wireless channels used by the access point 121 is free of interference. If a wireless channel used by the access point 121 is free of interference, at block 450, a determination may be made whether the access point 121 can execute a high-speed data transfer. If a high-speed data transfer can be carried out, operations indicated by block 430 and subsequent blocks may be executed. If high-speed data transfer cannot be carried out, operations indicated by block 485, block 490, block 420, and subsequent blocks may be executed.

The various operations described in this disclosure are generally directed at ensuring that data transfers (uploads and downloads) between a number of autonomous vehicles and the access points in the parking area 120 are optimized in terms of various parameters such as, for example, an overall amount of data transferred over a period of time (for example, during night hours when the autonomous vehicles are parked in the parking area 120 for various purposes such as for recharging battery systems, cleaning, servicing, uploading information, and/or downloading information) and taking into consideration various factors such as priorities for data transfer from/to certain autonomous vehicles, equipment available in the various autonomous vehicles, and time available for data transfer on some or all of the autonomous vehicles.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 203, the memory 233, and the memory 253, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a computer, from a first computer located in a first autonomous vehicle, an indication of a size of a first dataset available for uploading from the first computer to one or more access points located in a parking area; and communicating, by the computer, to the first computer, at least a first set of instructions to park the first autonomous vehicle in one of a first parking spot that is located inside an operating range of a first access point or a second parking spot that is located inside an operating range of a second access point, wherein the first set of instructions is based, at least in part, on the size of the first dataset.

2. The method of claim 1, further comprising:
receiving, by the computer, from a second computer located in a second autonomous vehicle, an indication of a size of a second dataset available for uploading from the second computer to the one or more access points located in the parking area; and
communicating, by the computer, to the second computer, at least a second set of instructions to park the second autonomous vehicle in one of a third parking spot that is located inside an operating range of a third access point or a fourth parking spot that is located inside an operating range of a fourth access point, wherein the second set of instructions is based, at least in part, on at least one of the size of the second dataset, the size of the first dataset, or a combination of the size of the second dataset and the size of the first dataset.

3. The method of claim 1, further comprising:
receiving, by the computer, from a second computer located in a second autonomous vehicle, an indication of a size of a second dataset available for uploading from the second computer to the one or more access points located in the parking area;
communicating, by the computer, to the first computer located in the first autonomous vehicle, at least a second set of instructions to move the first autonomous vehicle to a third parking spot that is one of: located inside the operating range of the first access point, located inside the operating range of the second access point, or located inside an operating range of a third access point; and
communicating, by the computer, to the second computer located in the second autonomous vehicle, at least a third set of instructions to park the second autonomous vehicle in one of the first parking spot or the second parking spot vacated by the first autonomous vehicle, wherein the third set of instructions is based, at least in part, on the size of the second dataset.

4. The method of claim 3, wherein a first rate of data transfer provided by the first access point is different than a second rate of data transfer provided by the second access point.

5. The method of claim 1, wherein the first set of instructions is based, in further part, on at least one of: one or more characteristics of a first wireless transceiver that is provided in the first autonomous vehicle, one or more characteristics of at least one of the first access point or the second access point, or a size of a second dataset to be downloaded into the first computer from the computer.

6. The method of claim 5, wherein the one or more characteristics of the first wireless transceiver comprises at least one of: a communication format utilized by the first wireless transceiver or an operating range of the first wireless transceiver.

7. The method of claim 1, wherein the first set of instructions is based, in further part, on at least one of: a time of day when the first autonomous vehicle is parked in the parking area, an amount of time that the first autonomous vehicle will be parked in the parking area, a priority provided to the first autonomous vehicle for transferring data to the one or more access points located in the parking area, or historical information associated with data transfers between a first wireless transceiver that is provided in the first autonomous vehicle and the one or more access points located in the parking area.

8. A method comprising:
transmitting, by a first computer that is provided in a first autonomous vehicle, to a computer that is communicatively coupled to one or more access points located in a parking area, a message indicative of a size of a first dataset that is to be uploaded from the first autonomous vehicle to the one or more access points located in the parking area; and
receiving, by the first computer, from the computer, a first set of instructions to park the first autonomous vehicle in a first parking spot that is located inside an operating range of a first access point.

9. The method of claim 8, further comprising:
uploading, by the first computer to the first access point, a first portion of the first dataset;
receiving, by the first computer, from the computer, a second set of instructions to move the first autonomous vehicle from the first parking spot to a second parking spot that is one of: located inside the operating range of the first access point or located inside an operating range of a second access point;
moving the first autonomous vehicle from the first parking spot to the second parking spot; and
uploading, by the first computer to the one of the first access point or the second access point, a second portion of the first dataset.

10. The method of claim 9, wherein a first rate of data transfer provided by the first access point is different than a second rate of data transfer provided by the second access point.

11. The method of claim 8, wherein the computer generates the first set of instructions based, at least in part, on at least one of a size of the first dataset to be uploaded from the first autonomous vehicle to the one or more access points located in the parking area or a size of a second dataset to be downloaded into the first computer from the computer.

12. The method of claim 11, wherein the first set of instructions is based, in further part, on at least one of: one or more characteristics of a first wireless transceiver that is provided in the first autonomous vehicle, or one or more characteristics of the first access point.

13. The method of claim 12, wherein the one or more characteristics of the first wireless transceiver comprises at least one of: a communication format utilized by the first wireless transceiver or an operating range of the first wireless transceiver.

14. The method of claim 11, wherein the first set of instructions is based, in further part, on at least one of: a time of day when the first autonomous vehicle is parked in the parking area, an amount of time that the first autonomous vehicle will be parked in the parking area, a priority provided to the first autonomous vehicle for transferring data to the one or more access points located in the parking area, or historical information associated with data transfers between a first wireless transceiver that is provided in the first autonomous vehicle and the one or more access points located in the parking area.

15. A server computer comprising:
a first memory that stores computer-executable instructions; and a processor configured to access the first memory and execute the computer-executable instructions to at least:

receive, from a first computer located in a first autonomous vehicle, an indication of a size of a first dataset available for uploading from the first computer to one or more access points located in a parking area; and communicate, to the first computer, at least a first set of instructions to park the first autonomous vehicle in one of a first parking spot that is located inside an operating range of a first access point or a second parking spot that is located inside an operating range of a second access point, wherein the first set of instructions is based, at least in part, on the size of the first dataset.

16. The server computer of claim 15, wherein the computer-executable instructions further comprise:

receive, from a second computer located in a second autonomous vehicle, an indication of a size of a second dataset available for uploading from the second computer to the one or more access points located in the parking area; and communicate, to the second computer, at least a second set of instructions to park the second autonomous vehicle in one of a third parking spot that is located inside an operating range of a third access point or a fourth parking spot that is located inside an operating range of a fourth access point, wherein the second set of instructions is based, at least in part, on at least one of the size of the second dataset or a combination of the size of the second dataset and the size of the first dataset.

17. The server computer of claim 15, wherein the computer-executable instructions further comprise:

receive, from a second computer located in a second autonomous vehicle, an indication of a size of a second dataset available for uploading from the second computer to the one or more access points located in the parking area;

communicate, to the first computer located in the first autonomous vehicle, at least a second set of instructions to move the first autonomous vehicle to a third parking spot that is one of: located inside the operating range of the first access point, located inside the operating range of the second access point, or located inside an operating range of a third access point; and communicate, to the second computer located in the second autonomous vehicle, at least a third set of instructions to park the second autonomous vehicle in one of the first parking spot or the second parking spot vacated by the first autonomous vehicle, wherein the third set of instructions is based, at least in part, on the size of the second dataset.

18. The server computer of claim 17, wherein a first rate of data transfer provided by the first access point is different than a second rate of data transfer provided by the second access point.

19. The server computer of claim 15, wherein the first set of instructions is based, in further part, on at least one of: one or more characteristics of a first wireless transceiver that is provided in the first autonomous vehicle, or one or more characteristics of at least one of the first access point or the second access point.

20. The server computer of claim 19, wherein the one or more characteristics of the first wireless transceiver comprises at least one of: a communication format utilized by the first wireless transceiver, or an operating range of the first wireless transceiver.

* * * * *